(12) United States Patent
Yu (10) Patent No.: US 9,395,978 B2
(45) Date of Patent: Jul. 19, 2016

(54) MOBILE PHONE BASED SOFTWARE PROCESSING METHOD AND MOBILE PHONE

(71) Applicant: HUIZHOU TCL MOBILE COMMUNICATION CO., LTD., Huizhou (CN)

(72) Inventor: Bin Yu, Huizhou (CN)

(73) Assignee: HUIZHOU TCL MOBILE COMMUNICATION CO., LTD., Huizhou, Guangdong (CN)

( * ) Notice: Subject to any disclaimer, the term of this patent is extended or adjusted under 35 U.S.C. 154(b) by 435 days.

(21) Appl. No.: 14/123,160

(22) PCT Filed: Sep. 20, 2012

(86) PCT No.: PCT/CN2012/081645
§ 371 (c)(1),
(2) Date: Nov. 29, 2013

(87) PCT Pub. No.: WO2013/078899
PCT Pub. Date: Jun. 6, 2013

(65) Prior Publication Data
US 2014/0109047 A1 Apr. 17, 2014

(30) Foreign Application Priority Data
Nov. 28, 2011 (CN) .......................... 2011 1 0384557

(51) Int. Cl.
*G06F 9/44* (2006.01)
*G06F 9/445* (2006.01)

(52) U.S. Cl.
CPC .. *G06F 8/70* (2013.01); *G06F 8/62* (2013.01); *G06F 8/65* (2013.01); *G06F 9/44505* (2013.01)

(58) Field of Classification Search
None
See application file for complete search history.

(56) References Cited

U.S. PATENT DOCUMENTS

| | | | |
|---|---|---|---|
| 7,739,282 B1 * | 6/2010 | Smith | H04L 67/22 707/661 |
| 8,739,162 B2 * | 5/2014 | Kim | G06F 11/3423 718/100 |
| 2004/0163007 A1 * | 8/2004 | Mirkhani | G06F 11/3423 714/1 |
| 2005/0097543 A1 * | 5/2005 | Hirayama | G06F 8/65 717/168 |
| 2008/0046880 A1 * | 2/2008 | Jun | G06F 8/61 717/173 |
| 2010/0010644 A1 * | 1/2010 | Sip | G06F 8/62 700/28 |
| 2010/0125849 A1 * | 5/2010 | Oswald | G06F 9/4881 718/103 |
| 2011/0041143 A1 * | 2/2011 | Accapadi | G06F 11/302 719/321 |

* cited by examiner

*Primary Examiner* — Isaac T Tecklu
(74) *Attorney, Agent, or Firm* — Shimokaji IP (57) ABSTRACT

A mobile phone based software processing method recording time information of installation of each software program in a mobile phone; updating the latest time information of the software; and when it is detected that the time information of certain software is idle for more than a preset time interval, determining that the software is long-term idle, arranging and displaying a list of long-term idle software being idle for more than a preset time interval, and updating or unloading the long-time idle software automatically according to requirements.

20 Claims, 9 Drawing Sheets

MOBILE PHONE BASED SOFTWARE PROCESSING METHOD AND MOBILE PHONE

TECHNICAL FIELD

The invention relates to the field of mobile phone software processing, and particularly to a mobile phone based software processing method and a mobile phone.

BACKGROUND OF THE INVENTION

With the continuous development of electronic technology, various mobile phones may be used more and more widely, and a user may often install lots of mobile software in a smart phone. The user may encounter the following two cases in a smart phone:

(1) Some software may not be used for a long time after being installed; if there is lots of such software and this software remains idle for a long time, the internal memory of the mobile phone may be occupied, and finally, the operation of the mobile phone may become slow; and (2) Because the updating speed of software may be rapid, the version of the software may be too old when the software is used again by the user after being idle for a long time, and the software may not be updated in a timely manner.

Therefore, there is still room for improvement and development in the prior art.

SUMMARY OF THE INVENTION

A technical problem to be solved by the invention is to provide a mobile phone based software processing method and a mobile phone in view of the above defects in the prior art. The invention adds new functions to the mobile phone, can perform corresponding processing to software automatically, may solve problems regarding waste of software and hardware resources due to long-term idle software in the mobile phone, and can effectively avoid occupation of the internal memory of the mobile phone, improve the running speed of the mobile phone, and provide convenience for a user.

Technical solutions employed in the invention are as below.

A mobile phone based software processing method comprises the following steps of:

receiving an operation of a user to set a preset time interval, and then performing the steps of:

A: recording the time information of installation of each software program in a mobile phone, and storing the time information and corresponding software name in a designated file according to certain rules; and every time when the software is used, re-updating the time information of the latest use into the designated file;

B: regularly comparing the time information of each software program stored in the designated file with the current time, and determining whether the time information is more than a preset time interval; and C: when it is detected that time information of certain software is idle for more than a preset time interval, determining that the software is idle for a long time, arranging and displaying a list of long-term idle software being idle for more than the preset time interval, receiving an operation of the user to unload certain software and trigger a management module to work; searching corresponding items of the software in the designated file by calling the interface of an operating system, and deleting the items, by the management module.

The mobile phone based software processing method further comprises the following step prior to Step A: receiving an operation of the user to preset a regular time.

The mobile phone based software processing method further comprises the following step prior to Step A: pre-creating a designated file for storing time information of installation and service time of certain software, and defining the name of the designated file as SwInfoFile.

The mobile phone based software processing method, wherein, in Step A, recording time information of installation of each software program in a mobile phone and storing the time information and corresponding software name in a designated file according to certain rules further comprises the following steps of:

A11: receiving an operating instruction for installing software of the user, and acquiring the time of current software being installed by calling the interface of an operating system; and A12: creating new items corresponding to the current software being installed in the designated file by calling the interface of the operating system, and recording the time of current software being installed in Step A11.

The mobile phone based software processing method, wherein, in Step A, re-updating the time information of the latest use into the designated file every time the software is used comprises the following steps of:

A21: receiving an operation of the user to open certain software and trigger a management module to work, and acquiring the current time the software is opened by calling the interface of the operating system by the management module; and A22: searching corresponding items of the opened software in the designated file by calling the interface of the operating system by the management module, and updating the time in the searched corresponding items as the current time the software is opened in Step A21.

The mobile phone based software processing method, wherein, Step B further comprises the following steps of:

Step 601: triggering the management module to work when the regular time preset by the user is reached;

Step 602: acquiring the current time by calling the interface of the operating system by the management module;

Step 603: acquiring the time of recorded software one by one from the designated file by calling the interface of the operating system by the management module, comparing these times of recorded software with the time obtained in Step 602, and calculating idle days of all software; and Step 604: determining whether the idle days of all software calculated in Step 603 are more than the preset time interval according to the determining criterion of the preset time interval.

A mobile phone based software processing method, wherein, it comprises the following steps:

A: recording time information of installation of each software in a mobile phone, and storing the time information and corresponding software name thereof in a designated file according to certain rules; and every time when the software is used, re-updating the time information of the latest use into the designated file;

B: regularly comparing the time information of each software stored in the designated file with the current time, and deciding whether the time information is more than a preset time interval; and C: when it is detected that time information of certain software is idle for more than a preset time interval, determining whether the software is idle for a long time, arranging and displaying a list of long-term idle software being idle for more than the preset time interval, and updating or unloading the long-time idle software automatically according to requirements.

The mobile phone based software processing method, wherein, it further comprises the following steps prior to Step A: receiving an operation of a user to preset a regular time, and receiving an operation of the user to set the preset time interval.

The mobile phone based software processing method further comprises the following steps prior to Step A: pre-creating a designated file for storing time information of installation and service time of certain software, and defining the name of the designated file as SwInfoFile.

The mobile phone based software processing method, wherein, in Step A, recording time information of installation of each software program in a mobile phone and storing the time information and corresponding software name in a designated file according to certain rules further comprises the following steps of:

A11: receiving an operating instruction for installing software of the user, and acquiring the time of current software being installed by calling the interface of an operating system; and A12: creating new items corresponding to the current software being installed in the designated file by calling the interface of the operating system, and recording the time of current software being installed in Step A11.

The mobile phone based software processing method, wherein, in Step A, re-updating the time information of the latest use into the designated file every time the software is used comprises the following steps of:

A21: receiving an operation of the user to open certain software and trigger a management module to work, and acquiring the current time the software is opened by calling the interface of the operating system by the management module; and A22: searching corresponding items of the opened software in the designated file by calling the interface of the operating system by the management module, and updating the time in the searched corresponding items as the current time the software is opened in Step A21.

The mobile phone based software processing method, wherein, Step B further comprises the following steps of:

Step 601: triggering the management module to work when the regular time preset by the user is reached;

Step 602: acquiring the current time by calling the interface of the operating system by the management module;

Step 603: acquiring the time of recorded software one by one from the designated file by calling the interface of the operating system by the management module, comparing the time of recorded software with the time obtained in Step 602, and calculating idle days of all software; and Step 604: determining whether the idle days of all software calculated in Step 603 are more than the preset time interval according to the determining criterion of the preset time interval.

The mobile phone based software processing method, wherein, Step C further comprises the following steps of:

C11: receiving an operation of the user to unload certain software and trigger the management module to work; and C12: searching corresponding items of the software in the designated file by calling the interface of the operating system, and deleting the items by the management module.

A mobile phone, wherein, it comprises:

a setting module, which is used for receiving an operation of a user to preset a regular time and receiving an operation of the user to set a preset time interval;

a management module, on the one hand, which is used for recording time information of installation of each software in a mobile phone, and storing the time information and corresponding software name thereof in a designated file according to certain rules; re-updating the time information of the latest use into the designated file every time the software is used; regularly comparing the time information of each software program stored in the designated file with the current time, determining whether the time information is more than a preset time interval, and determining that the software is idle for a long time when it is detected that the time information of certain software is idle for more than a preset time interval; and a display module, which is used for arranging and displaying a list of long-term idle software being idle for more than the preset time interval, and updating or unloading the long-time idle software automatically according to requirements.

The mobile phone further comprises a create module, which is used for pre-creating a designated file for storing time information of installation and service time of certain software.

The mobile phone, wherein the management module further comprises:

a software installation management unit, which is used for receiving an operating instruction for installing software of the user, and acquiring the time of current software being installed by calling the interface of an operating system; and creating new items corresponding to the current software being installed in the designated file by calling the interface of the operating system, and recording the time of current software being installed;

a time updating unit, which is used for receiving an operation of the user to open certain software, and acquiring the current time the software is opened by calling the interface of the operating system; and searching corresponding items of the opened software in the designated file by calling the interface of the operating system, and updating the time in the searched corresponding items of the opened software into the current time of opening the software;

a comparing unit, which is used for acquiring the current time by calling the interface of the operating system when the regular time preset by the user is reached; acquiring the time of recorded software one by one from the designated file by calling the interface of the operating system, comparing the acquired time of recorded software with the current time acquired, and calculating idle days of all software; and determining whether the idle days of all software are more than the preset time interval according to the determining criterion of the preset time interval; and a software unloading management unit, which is used for receiving an operation of the user to unload certain software, searching corresponding items of the software in the designated file by calling the interface of the operating system, and deleting the items.

The mobile phone based software processing method and the mobile phone provided by the embodiments of the invention may add new functions to the mobile phone. When certain application software installed in the mobile phone by the user is not used for a long time, the updating or unloading processing may be performed automatically according to requirements. The method and the mobile phone can find long-term idle software in the mobile phone, effectively avoid the occupation of the internal memory of the mobile phone, and avoid the unnecessary waste of resources. The mobile phone has a simple structure and small workload. In addition, the invention improves the running speed of the mobile phone and provides convenience for the user.

DETAILED DESCRIPTION OF THE INVENTION

The invention provides a mobile phone based software processing method and a mobile phone. To make the objectives, technical solutions and advantages of the invention clearer and more explicit, the invention is further described below in detail with reference to drawings and embodiments. It should be understood that the specific embodiments described herein are just for the purpose of explanation, but not intended to limit the invention.

Figure 1:
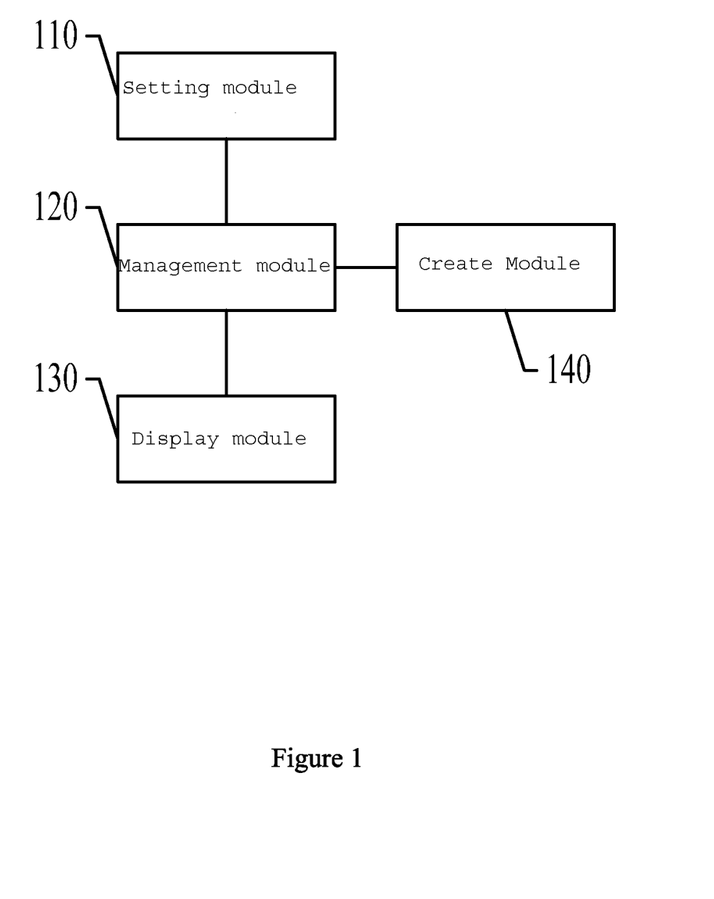
FIG. 1 is a functional principle diagram of a mobile phone of an embodiment of the invention.

An embodiment of the invention provides a mobile phone, as shown in FIG. 1, mainly comprising:

a setting module 110, which is used for receiving an operation of a user to preset a regular time and set a preset time interval;

a management module 120, which is used for recording time information of installation of each software in a mobile phone, and storing the time information and corresponding software name thereof in a designated file according to certain rules; re-updating the latest time information of use to the designated file every time the software is used; and regularly comparing the time information of each software stored in the designated file with the current time, determining whether the time information is more than a preset time interval, and determining that the software is idle for a long time when it is detected that time information of certain software is idle for more than a preset time interval; and a display module 130, which is used for arranging and displaying a list of long-term idle software being idle for more than the preset time interval, and updating or unloading the long-time idle software automatically according to requirements.

In a further embodiment, as shown in FIG. 1, the mobile phone further comprises:

a create module 140, which is used for pre-creating a designated file for storing time information of installation, and service time of certain software.

Figure 2:
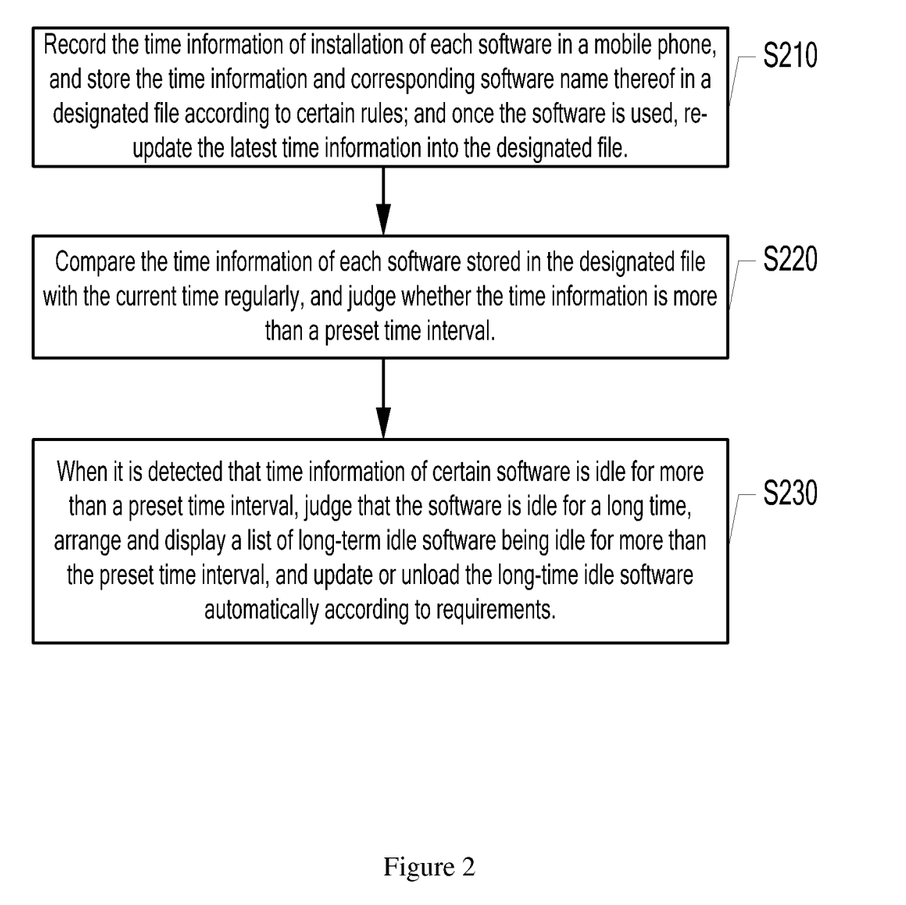
FIG. 2 is a flow chart of a mobile phone based software processing method of an embodiment of the invention.

Based on the above, the invention also provides a mobile phone based software processing method. As shown in FIG. 2, the method comprises the following steps of:

Step 210: recording time information of installation of each software in a mobile phone, and storing the time information and corresponding software name in a designated file according to certain rules; and every time when the software is used, re-updating the latest time information of the software use to the designated file;

Step 220: regularly comparing the time information of each software stored in the designated file with the current time, and determining whether the time information is more than a preset time interval; and Step 230: when it is detected that time information of certain software is idle for more than a preset time interval, determining that the software is idle for a long time, arranging and displaying a list of long-term idle software being idle for more than the preset time interval, and updating or unloading the long-time idle software automatically according to requirements.

The invention is further described below in detail with specific embodiments.

To achieve the above purpose, the mobile phone of the invention records time information of certain software installed by a user. When the user uses the software, the time information will be updated; and whether the software is idle for a long time or not is daily checked at a fixed time. A list of long-term idle software will be displayed to remind the user of processing. The fixed time of a daily check and the determination criterion of long-term idleness are preset in a setting menu by the user. Namely, before S210, the method further comprises the following steps of: receiving an operation of the user to preset a regular time. For example, setting the regular time as 10:00 AM every day, and receiving an operation to set the preset time interval, for example, every 60 days.

Figure 3:
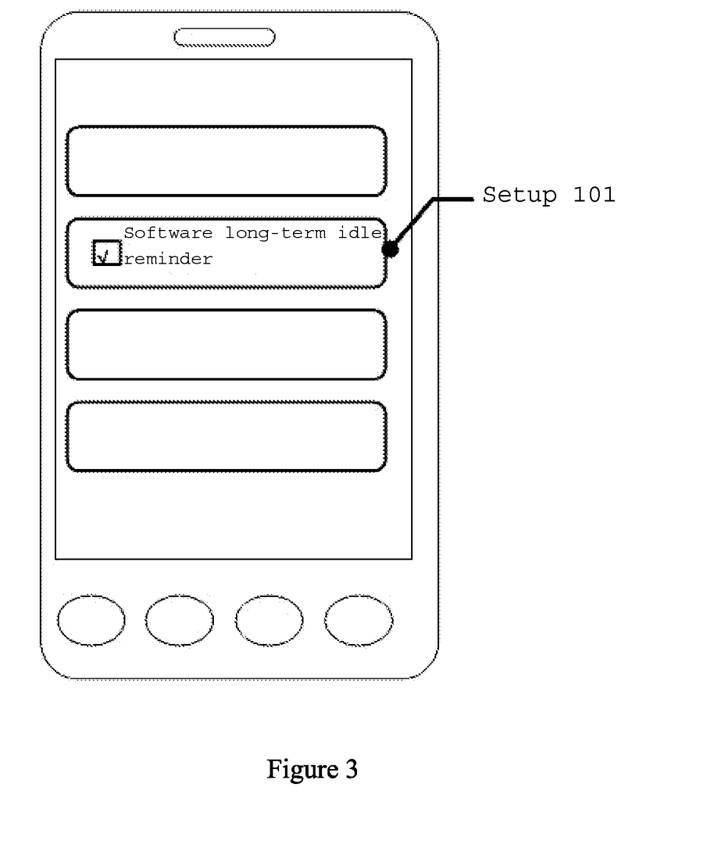
FIG. 3 is a structure diagram illustrating when a user accesses a corresponding setting menu and then sets selections to open a software long-term idle reminder function in an embodiment of the invention.
Figure 4:
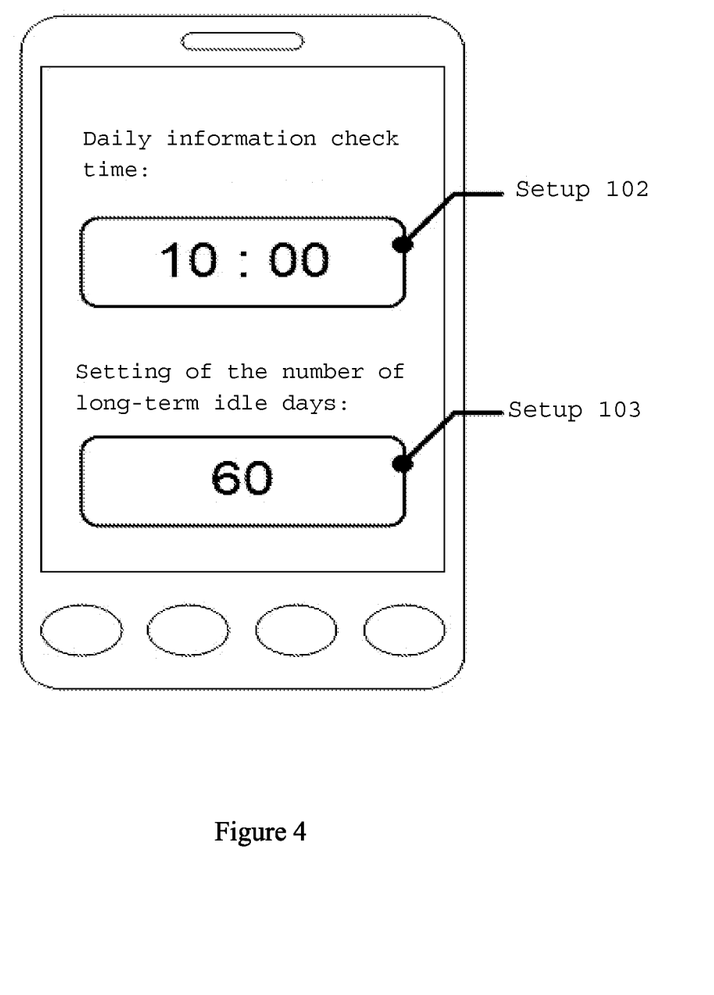
FIG. 4 is a structure diagram of an interface for setting a regular software detection time and idle days in a mobile phone of an embodiment of the invention.

For example, as shown in FIG. 3, the user accesses a corresponding setting menu to select startup, i.e., setup 101: selecting a software long-term idle reminder; then the menu is set, in which the setting contents comprise (1) a fixed time T for a regular check every day, as shown in FIG. 4, i.e., setup 102: setting the time of daily information detection as 10:00; (2) the determination criterion D of long-term idleness, i.e., receiving an operation of the user to set the preset time interval. As shown in FIG. 4, setup 103: setting the number of long-term days to 60 days.

In a further embodiment, prior to S210, the method further comprises the following steps of: pre-creating a designated file for storing time information of installation and service time of software, and defining the name of the designated file as SwInfoFile.

Figure 5:
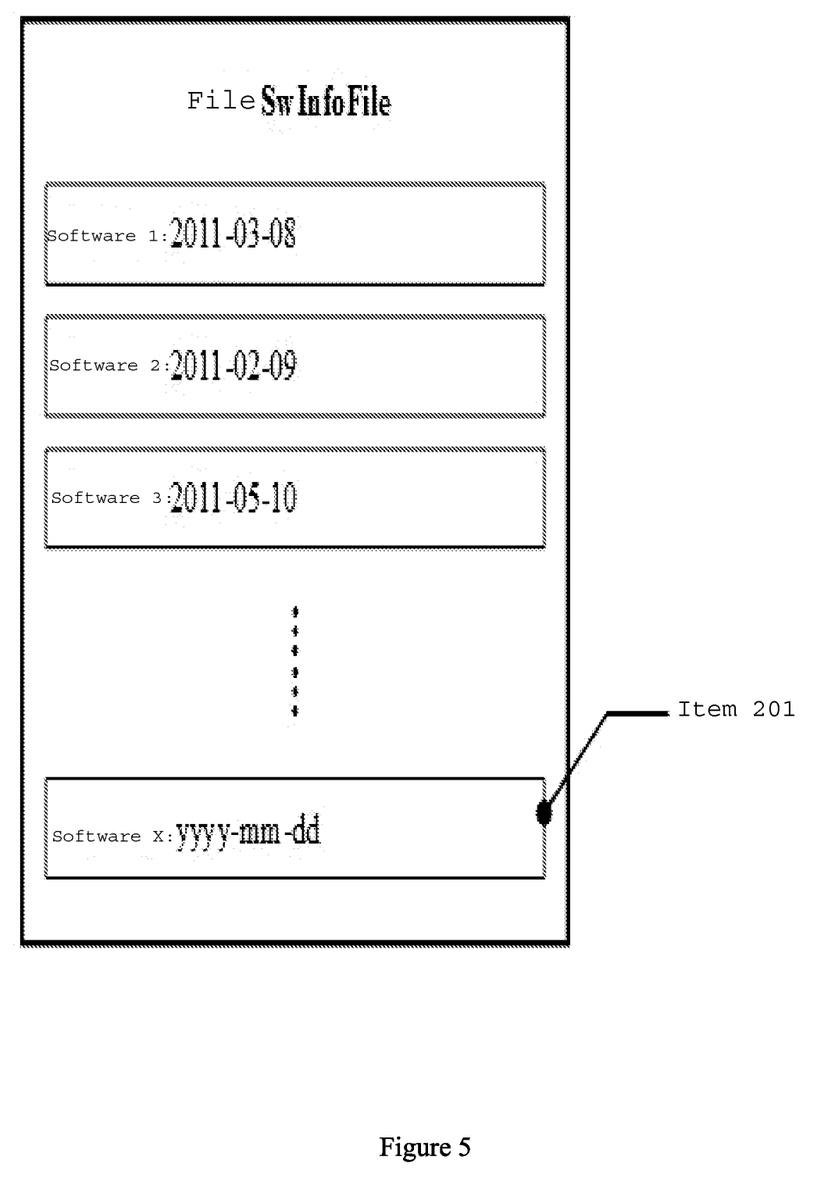
FIG. 5 is a structure diagram of items of a designated file in an embodiment of the invention.

For example, when the mobile phone in an embodiment of the invention receives an operation of the user to start a function which reminds the user of processing long-term idle software, a management module begins to work and record the time information of software installed by the user. To be convenient for management, the software and time information are stored by a file SwInfoFile, as shown in Item 201 of FIG. 5. When the user installs software X, a new item 201 is created in the file SwInfoFile, and the current time is recorded. When the user starts the software X, the time information in the item 201 is updated to the current time. At the daily check time preset by the user, the management module may check software time information of all items in the file SwInfoFile and calculate the number of days different from the current time. If the number of days is greater than the preset number of days of the user, a display module is informed to list them out and prompt the user. If the user unloads long-term idle software, corresponding items in the file SwInfoFile will be deleted.

Namely, in S210 of an embodiment of the invention, recording time information of installation of each software program in a mobile phone and storing the time information and corresponding software name in a designated file according to certain rules further comprises the following steps of:

A11: receiving an operating instruction for installing software of the user, and acquiring the time of current software being installed by calling the interface of the operating system; and A12: creating new items corresponding to the current software being installed in the designated file by calling the interface of the operating system, and recording the time of current software installed in Step A11.

Figure 6:
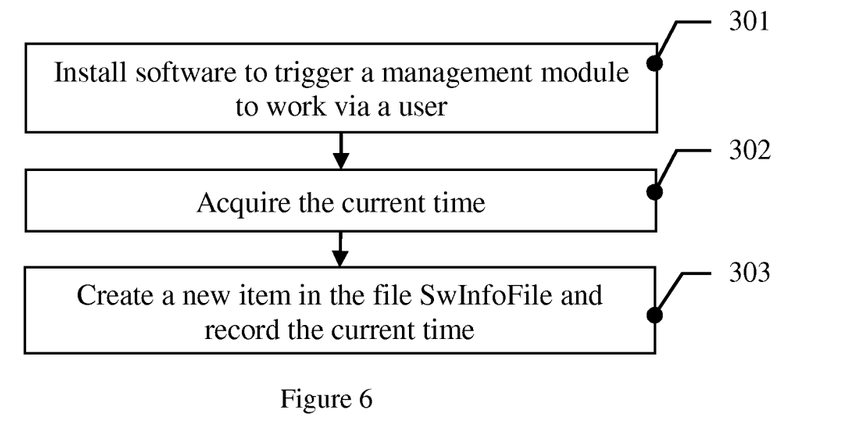
FIG. 6 is a flow diagram illustrating when a user installs software in an embodiment of the invention.

For example, FIG. 6 is a process flow when a user installs software, specifically comprising the following steps:

Step 301: installing certain software to trigger the management module to work by the user;

Step 302: acquiring the current time by calling the interface of the operating system by the management module; and Step 303: creating new items in the file SwInfoFile by calling the interface of the operating system by the management module, in which the format is as shown in Item 201, and recording the current time in Step 302 in the created items.

Further, in S201, re-updating the latest time information into the designated file every time the software is used comprises the following steps of:

A21: receiving an operation of the user to open certain software and then trigger a management module to work, and acquiring the current time the software is opened by calling the interface of the operating system by the management module; and A22: searching corresponding items of the opened software in the designated file by calling the interface of the operating system by the management module, and updating the time in the searched corresponding items as the current time the software is opened in Step A21.

Figure 7:
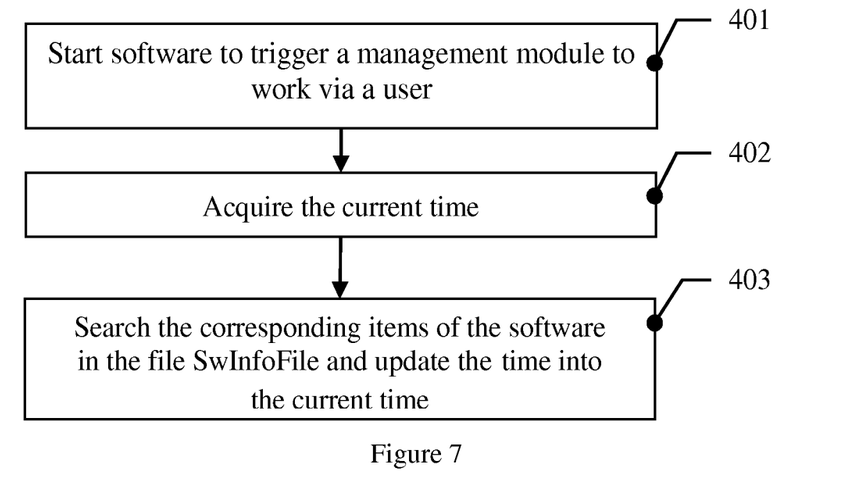
FIG. 7 is a flow diagram illustrating when a user opens certain software in an embodiment of the invention.

For example, FIG. 7 is a process flow that illustrates when a user opens certain software, specifically comprising the following steps of:

Step 401: the user opening certain software to trigger the management module to work;

Step 402: acquiring the current time by calling the interface of the operating system by the management module; and Step 403: searching corresponding items of the software in the file SwInfoFile by calling the interface of the operating system by the management module, and updating the time in the searched corresponding items of the software into the time acquired in Step 402.

Figure 8:
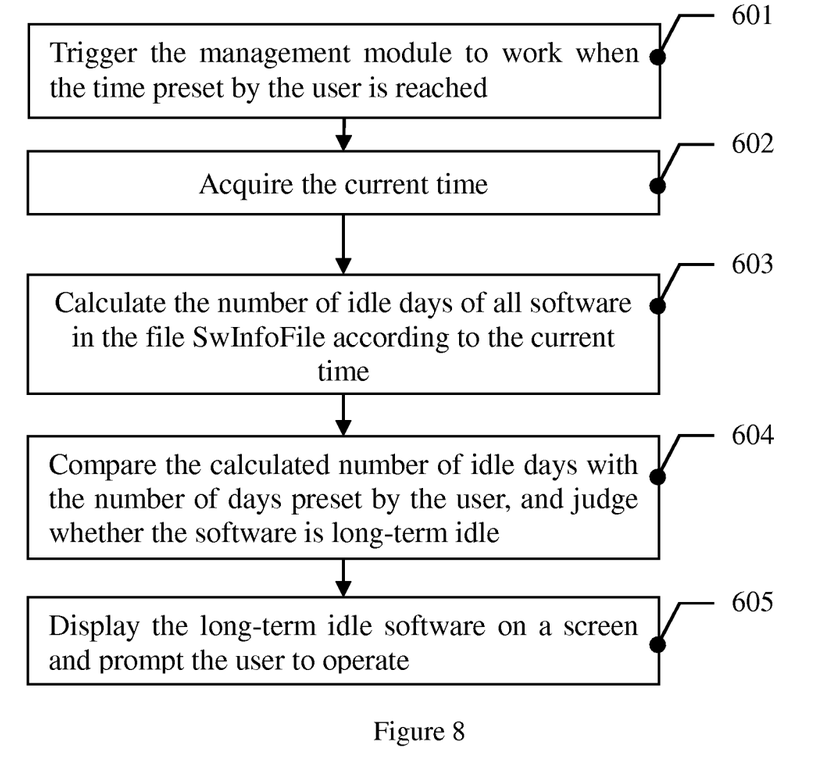
FIG. 8 is a flow diagram of daily checking whether software is idle for a long time according to a preset time of a user in an embodiment of the invention.

In a further embodiment, as shown in FIG. 8, the flow of daily checking whether software is in a long-term idle according to the preset time of the user comprises the following steps of:

Step 601: triggering the management module to work when the time preset by the user is reached, in which the preset time is the time in the setup 102 of FIG. 4, i.e., triggering the management module to work when a regular time preset by the user is reached;

Step 602: acquiring the current time by calling the interface of the operating system by the management module;

Step 603: acquiring the time software is recorded one by one from the designated file (shown as file SwInfoFile in FIG. 5 of this embodiment) by calling the interface of the operating system by the management module, comparing these times the software is recorded with the time obtained in Step 602, and calculating the number of idle days of all software; and Step 604: determining software that decides whether the number of idle days of all software calculated in Step 603 are more than the number of days preset by the user (whether the number of idle days is more than the preset time interval) according to the determination criterion of the preset time interval, i.e., the determination criterion of the number of idle days preset by the user, in which the determination criterion of the number of idle days preset by the user is the number of days in the setup 103.

Then, the software determined to be long-term idled in Step 604 is displayed on a screen to prompt the user for operation, or the long-term idle software is updated or unloaded automatically according to requirements.

The flow of unloading certain software by the user comprises the following steps of:

C11: receiving an operation of the user to unload certain software and then trigger the management module to work; and C12: searching corresponding items of the software in the designated file by calling the interface of the operating system, and deleting the items, by the management module.

Figure 9:
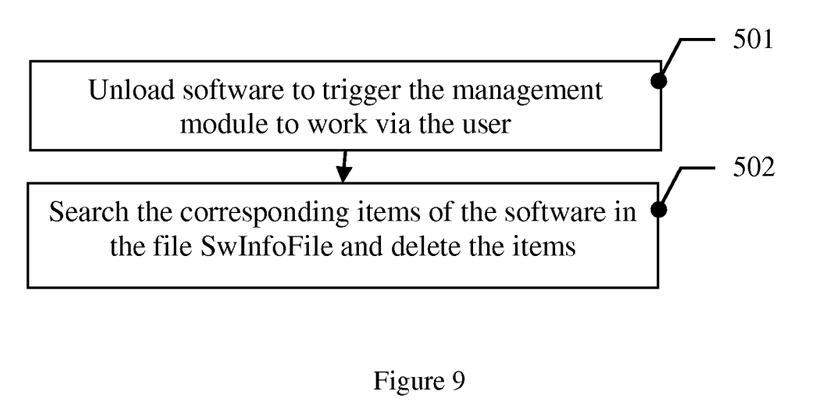
FIG. 9 is a flow diagram illustrating when a user unloads certain software in an embodiment of the invention.

For example, as shown in FIG. 9, the flow of unloading certain software by the user comprises the following steps of:

Step 501: the user unloading certain software to trigger the management module to work; and Step 502: searching corresponding items of the software in the file SwInfoFile by calling the interface of the operating system, and deleting the items, by the management module.

Figure 10A:
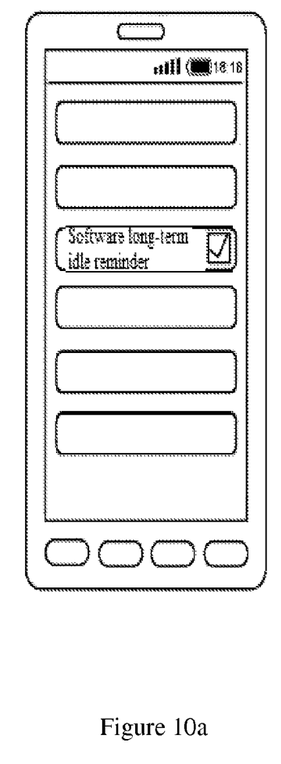
FIG. 10a, FIG. 10b and FIG. 10c are structure diagrams of a specific example the invention.
Figure 10B:
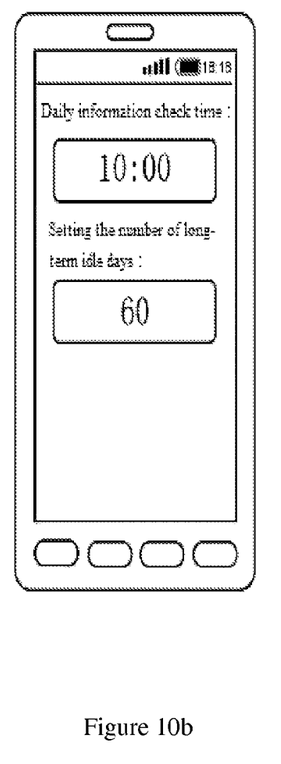
Figure 10C:
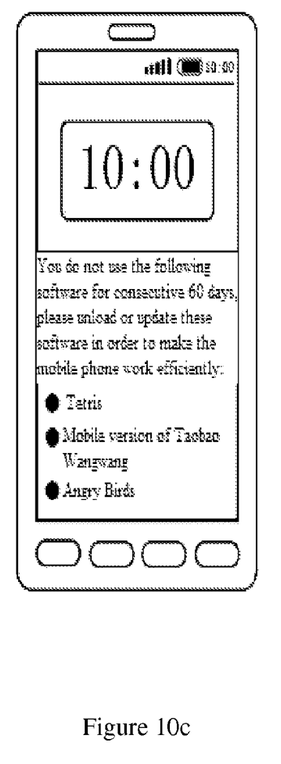

To describe specific applications of the invention more visually, FIG. 10a, FIG. 10b and FIG. 10c give an application example. In FIG. 10a, the user opens a software long-term idle reminding function and makes corresponding settings shown in FIG. 10b. The time of daily information check is set as 10:00, and the number of long-term idle days is set as 60 days. As shown in FIG. 10c, when the software is not used by the user for a consecutive 60 days after a period of time, the invention may remind the user, for example, as shown in FIG. 10c, "You have not used the following software for consecutive 60 days, please unload or update these software in order to make the mobile phone work efficiently:

Tetris

Mobile version of Taobao Wangwang

Angry Birds".

As described above, the mobile phone based software processing method and the mobile phone provided by the embodiments of the invention add new functions to the mobile phone, and can perform corresponding processing to software automatically, find long-term idle software in a timely manner and avoid unnecessary waste of resources. In addition, the method and the mobile phone solve the problems regarding the waste of software and hardware resources due to long-term idle software in the mobile phone, and can effectively avoid the occupation of the internal memory of the mobile phone, improve the running speed of the mobile phone, and provide convenience for a user.

Figure 11:
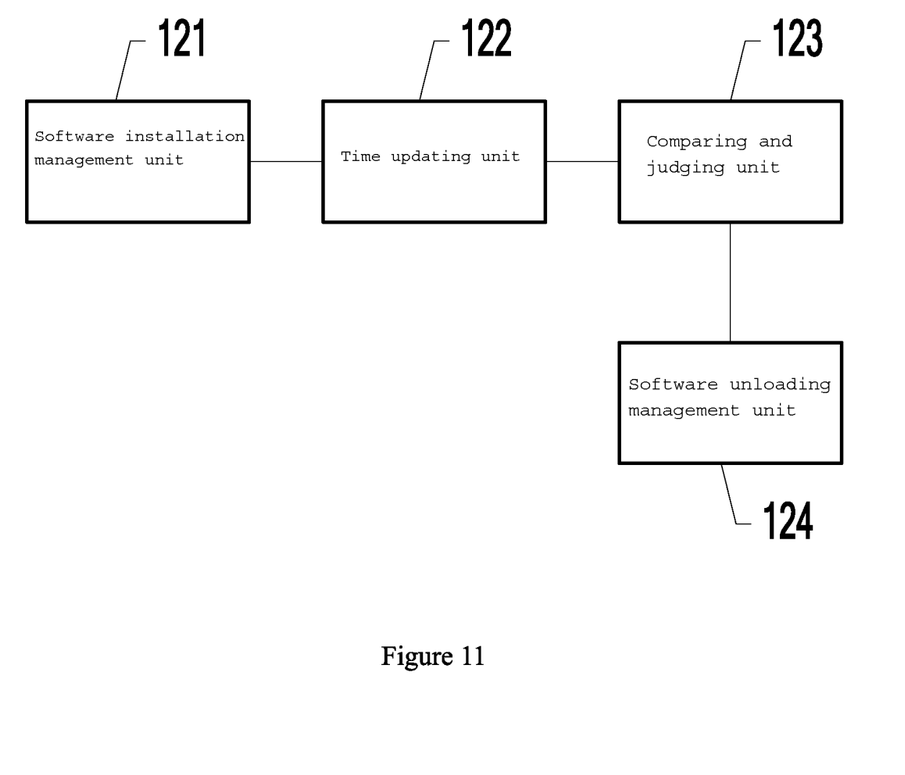
FIG. 11 is a principle diagram of internal function of a management module of a mobile phone in an embodiment of the invention.

Based on the above embodiments, as shown in FIG. 11, the management module 120 of the mobile phone in the invention further comprises:

a software installation management unit 121, which is used for receiving an operating instruction for installing software of the user, and acquiring the time of current software being installed by calling the interface of an operating system; and, creating new items corresponding to the current software being installed in the designated file by calling the interface of the operating system, and recording the time of current software being installed; specific details are as mentioned above;

a time updating unit 122, which is used for receiving an operation of the user to open certain software, and acquiring the current time the software is opened by calling the interface of the operating system; and searching corresponding items of the opened software in the designated file by calling the interface of the operating system, and updating the time of the corresponding items as the current time the software is opened; specific details are as mentioned above;

a comparing and determining unit 123, which is used for when the regular time preset by the user is reached, acquiring the current time by calling the interface of the operating system; acquiring the time software is recorded one by one from the designated file by calling the interface of the operating system, comparing the time of recorded software with the current time acquired, and calculating idle days of all software; and, determining whether the idle days of all software are more than the preset time interval according to the determining criterion of the preset time interval; specific details are as mentioned above; and a software unloading management unit 124, which is used for receiving an operation of the user to unload certain software, searching corresponding items of the software in the designated file by calling the interface of the operating system, and deleting the items; specific details are as mentioned above.

In conclusion, the mobile phone based software processing method and the mobile phone provided by the embodiments of the invention add new functions to the mobile phone. When certain application software installed in the mobile phone by the user is not used for a long time, the updating or unloading processing will be performed automatically according to requirements. The method and the mobile phone can find long-term idle software in the mobile phone, effectively avoid the occupation of the internal memory of the mobile phone, and avoid the unnecessary waste of recourses. The mobile phone has a simple structure and small workload. In addition, the invention improves the running speed of the mobile phone and provides convenience for the user.

It is should be understood that applications of the invention are not limited to the above examples. An ordinary person skilled in the art may make improvements or conversions according to the above descriptions, and all those improvements and conversions should fall into the protective scope of the attached claims of the invention.

Embodiments
Implementation Ways of the Invention
Industrial Applicability
Free Contents of a Sequence List

The invention claimed is:

1. A mobile phone based software processing method, comprising the following steps:
   receiving an operation of a user to set a preset time interval, and
   performing the following steps of:
   recording a time information of installation of software in a mobile phone, and storing the time information and a corresponding software name in a designated file according to certain rules; and every time the software is used, re-updating the time information of the latest use of the software into the designated file;
   regularly comparing the time information of the software stored in the designated file with the current time and determining whether the time information is more than the preset time interval; and
   when it is detected that time information of the software is idle for more than the preset time interval, determining that the software is idle for a long time,
   arranging and displaying a list of long-term idle software that are idle for more than the preset time interval,
   receiving an operation of the user to unload certain software and trigger a management module to work;
   searching corresponding items of the software in the designated file by calling the interface of an operating system, and
   deleting the items, by the management module.

2. The mobile phone based software processing method of claim 1, further comprising the following step prior to the recording step: receiving an operation of the user to preset a regular time.

3. The mobile phone based software processing method of claim 1, further comprising the following step prior to the recording step: pre-creating a designated file for storing time information of installation and service time of certain software, and defining the name of the designated file as SwInfoFile.

4. The mobile phone based software processing method of claim 1, wherein, in the recording step, recording time information of installation of each software in a mobile phone and storing the time information and corresponding software name in a designated file according to certain rules further comprise the following steps of:
   receiving an operating instruction for software being installed,
   acquiring a time of current software being installed by calling the interface of an operating system,
   creating a plurality of items corresponding to the current software being installed in the designated file by calling the interface of the operating system, and
   recording the time of the current software being installed.

5. The mobile phone based software processing method of claim 1, wherein, in the recording step, re-updating the time information of the latest use into the designated file every time the software is used comprises the steps of:
   receiving an operation of the user to open certain software and trigger a management module to work, and acquiring the current time of opening the software by calling the interface of the operating system by the management module; and
   searching a plurality of items corresponding to the opened software in the designated file by calling the interface of the operating system by the management module, and updating the time in the searched items corresponding to the opened software as the current time of opening the software.

6. The mobile phone based software processing method of claim 2, wherein the regularly comparing the time information further comprises the following steps of:
   triggering the management module to work when the regular time preset by the user is reached;
   acquiring the current time by calling the interface of the operating system by the management module;
   acquiring the time of software recording one by one from the designated file by calling the interface of the operating system by the management module, comparing these times of software recording with the current time acquired, and calculating idle days of all software; and
   determining software of whether the idle days of all software are more than the preset time interval according to the determining criterion of the preset time interval.

7. A mobile phone based software processing method, comprising the following steps:

recording time information of installation of each software in a mobile phone, and storing the time information and corresponding software name thereof in a designated file according to certain rules; and every time the software is used, re-updating the time information of the latest use of each software into the designated file;

regularly comparing the time information of each software stored in the designated file with the current time and determining whether the time information is more than a preset time interval; and when it is detected that the time information of certain software is idle for more than the preset time interval, determining that the certain software is idle for a long time, arranging and displaying a list of long-term idle software being idle for more than the preset time interval;

receiving an operation of the user to unload certain software and trigger a management module to work;

searching corresponding items of the software in the designated file by calling the interface of an operating system, deleting the items, by the management module, and updating or unloading the long-time idle software automatically according to requirements.

8. The mobile phone based software processing method of claim 7, further comprising the following steps prior to the recording step: receiving an operation of a user to preset a regular time, and receiving an operation of the user to set the preset time interval.

9. The mobile phone based software processing method of claim 7, further comprising the following steps prior to the recording step: pre-creating a designated file for storing time information of installation and service time of certain software, and defining the name of the designated file as SwInfoFile.

10. The mobile phone based software processing method of claim 7, wherein, in the recording step, recording time information of installation of each software in a mobile phone and storing the time information and corresponding software name in a designated file according to certain rules further comprises the following steps of:

receiving an operating instruction for software being installed of the user, and acquiring the time of current software being installed by calling the interface of an operating system; and creating a plurality of items corresponding to the current software being installed in the designated file by calling the interface of the operating system, and recording the time of current software being installed.

11. The mobile phone based software processing method of claim 7, wherein, in the recording step, re-updating the time information of the latest use into the designated file every time the software is used specifically comprises the following steps of:

receiving an operation of the user to open certain software and trigger a management module to work, and acquiring the current time of opening the software by calling the interface of the operating system by the management module; and searching corresponding items of the opened software in the designated file by calling the interface of the operating system by the management module, and updating the time in the items as the current time of opening the software.

12. The mobile phone based software processing method of claim 8, wherein comparing the time information of each software stored in the designated file further comprises the following steps of:

triggering the management module to work when the regular time preset by the user is reached;

acquiring the current time by calling the interface of the operating system by the management module;

acquiring the time of recorded software one by one from the designated file by calling the interface of the operating system by the management module, comparing the time of recorded software with the time acquired, and calculating idle days of all software; and determining whether the idle days of all software calculated are more than the preset time interval according to the determining criterion of the preset time interval.

13. The mobile phone based software processing method of claim 7, wherein the detecting step further comprises the following steps of:

receiving an operation of the user to unload certain software and trigger the management module to work; and searching corresponding items of the software in the designated file by calling the interface of the operating system, and deleting the items, by the management module.

14. A mobile phone, comprising:

a processor and memory;

a setting module, which is used for receiving an operation of a user to preset a regular time and receiving an operation of the user to set a preset time interval;

a management module, which is used for recording time information of installation of each software in a mobile phone, and storing the time information and corresponding software name thereof in a designated file according to certain rules; re-updating the time information of the latest used software into the designated file every time when the software is used; and wherein the management module is further used for regularly comparing the time information of each software stored in the designated file with the current time, determining whether the time information is more than a preset time interval, and determining that the software is idle for a long time when it is detected that the time information of the software is idle for more than a preset time interval;

searching corresponding items of the software in the designated file by calling the interface of an operating system, deleting the items, by the management module, and a display module, which is used for arranging and displaying a list of long-term idle software being idle for more than the preset time interval, and updating or unloading the long-time idle software automatically according to requirements.

15. The mobile phone of claim 14, further comprising a create module, which is used for pre-creating a designated file for storing time in order of installation and service time of certain software.

16. The mobile phone of claim 14, wherein the management module further comprises:

a software installation management unit, which is used for receiving an in service instruction for software being installed of the user, and acquiring a time of current software being installed by calling the interface of an operating system; and, creating a plurality of items corresponding to the current software being installed in the designated file by calling the interface of the operating system, and recording the time of current software being installed;

a time updating unit, which is used for receiving an operation of the user to open certain software, and acquiring the current time of opening the software by calling the interface of the operating system; and searching corresponding items of the opened software in the designated file by calling the interface of the operating system, and updating the time in the items into the current time of opening the software;

a comparing and determining unit, which is used for acquiring the current time by calling the interface of the operating system when the regular time preset by the user is reached; acquiring the time of recorded software one by one from the designated file by calling the interface of the operating system, comparing the acquired time of recorded software with the current time acquired, and calculating idle days of all software; and, determining software of whether the idle days of all software are more than the preset time interval according to the determining criterion of the preset time interval; and a software unloading management unit, which is used for receiving an operation of the user to unload certain software, searching corresponding items of the software in the designated file by calling the interface of the operating system, and deleting the items.

17. The mobile phone based software processing method of claim 1, wherein the time information of the certain software is detected on a daily basis.

18. The mobile phone based software processing method of claim 7, wherein the time information of the certain software is detected on a daily basis.

19. The mobile phone of claim 14, wherein the time information of certain software is detected on a daily basis.

20. The mobile phone based software processing method of claim 1, wherein the time information of the certain software is detected at a predetermined fixed time each day.

* * * * *